May 11, 1965  F. W. KERNEY ETAL  3,182,449
ENERGY ABSORBER
Filed June 26, 1961  2 Sheets-Sheet 1

INVENTORS,
FRANCIS W. KERNEY
MILTON GERSHON
BY DONALD ZIMMET

AGENT

United States Patent Office 3,182,449
Patented May 11, 1965

3,182,449
ENERGY ABSORBER
Francis W. Kerney, Pompton Plains, Milton Gershon, Morristown, and Donald Zimmet, River Edge, N.J., assignors to Thiokol Chemical Corporation, Bristol, Pa., a corporation of Delaware
Filed June 26, 1961, Ser. No. 123,924
8 Claims. (Cl. 60—35.6)

This invention relates generally to rocket powerplants and more particularly to a cushioning device for relatively movable parts thereof.

A major problem encountered in rocket powered missile operation is the fact that many components (guidance system, etc.) are sensitive to shock loads caused possibly by rocket engine ignition or rapid operation of valve-type and other components such as a shear slide as described in the following paragraphs.

One type of rocket powerplant, which is storable for an indefinite period pending its use is the packaged liquid rocket engine which embodies propellant tanks surrounding the engine combustion chamber and having propellant ports communicating therewith. The ports are sealed by rupturable diaphragm cups supported in aligned recesses formed in a shear slide and shearing movement of the slide is prevented by a retaining pin which is sheared by a given gas pressure when the rocket is ignited or fired so as to effect rupture of the cups and to align the tank ports and conforming shear slide ports so as to admit propellant to the engine combustion chamber.

The slide moves from an initial position in which it is retained by the shear pin to the final position in which the tank ports and slide ports are aligned and is arrested there by the engagement of a slide shoulder with a shoulder on the inner face of the engine wall or header. The predetermined gas pressure required after ignition of the powerplant to effect movement of the slide imparts a high acceleration and high velocity thereto. Because of this effect the arresting of the slide by the shoulders is accompanied by a severe shock which may damage the engine and its parts and can seriously impair performance of the engine. One example of such damage to relatively movable parts of the engine is the failure of a shoulder so that the slide is not arrested as designed but overruns the position of proper propellant port alignment. Another problem is that of rebound brought about by the shock which also may prevent proper propellant port alignment.

Accordingly, the main object of the present invention is to provide a cushioning or energy absorbing device for relatively movable parts which are sensitive to shock resulting from the arresting of the movement.

An important object of the invention is to provide a cushioning or energy absorbing device for relatively movable parts which will effectively absorb the energy of the motion as it is arrested so as to eliminate or substantially reduce the normal shock or rebound thereof.

Another important object of the present invention is to provide a cushioning or energy absorbing device for a pair of members which are relatively movable from an initial to a final position at which motion is thereby arrested without damaging shock or undesirable rebound.

A further important object of the present invention is to provide a rocket powerplant having a slide movable within the engine combustion chamber from an initial to a final position at which it is arrested, and having cushioning or energy absorbing means so arranged and positioned as to materially reduce the shock and rebound brought about by the arresting of the slide.

Other objects and advantages of the invention will become apparent during the course of the following description:

In the drawings we have shown four embodiments of the invention. In these showings:

Figure 1:
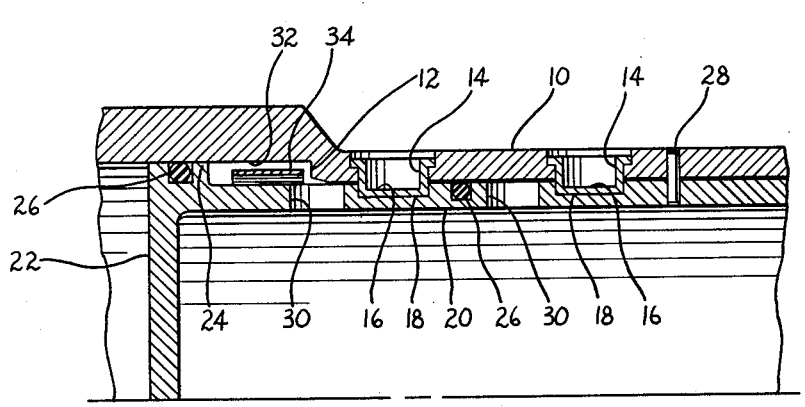
FIGURE 1 is a fragmentary, central, longitudinal sectional view of one form of the invention showing the shear slide of a rocket engine in its initial position.

In its broadest aspects, the invention contemplates a novel cushioning or energy absorbing device as well as its combination with a pair of members which are relatively movable from an initial to a final position, the arresting energy of the movement of the members which is normally accompanied by rebound and damaging shock being effectively absorbed by crushing and deforming of the cushioning device due to the nature of its material and design.

Referring to the drawings, numeral 10 designates the combustion chamber wall or header of a rocket engine having an inner annular shoulder 12 and spaced propellant inlet ports 14 sealed by shear cups 16 supported by and mounted in recesses 18 of a shear slide 20 having a head 22 including a peripheral shoulder 24. The shear slide 20 has a close sliding fit within the combustion chamber wall 10 and is provided with suitable O-ring seals 26.

The slide 20 moves to the right from an initial, pre-firing position (FIGURE 1) in which it is retained by a shear pin 28 to a final, ignition or firing position (FIGURE 2) where spaced ports 30 formed in the slide 20 are aligned with the propellant inlet ports 14 as the shoulder 24 engages the header shoulder 12 to arrest movement of the slide.

In the initial position of the slide 20, the shoulders 24 and 12 and the header and slide define a cushioning chamber 32 in which a cushion or energy absorber 34 is positioned. As shown in FIGURE 1, the cushion is in the form of a ring of relatively soft metal such as aluminum which will collapse under the desired loading condition (movement of the slide to the right by gas pressure upon ignition of the rocket engine) to act as a shock absorber but will not have the characteristics of a spring to cause rebound of the slide 20 away from the shoulder 12.

The soft metal cushioning ring 34 extends almost the length of the cushioning chamber 32 so that the crushing and deforming of the ring starts during the initial part of the movement of the slide 20 in the header 10. The crushing of the ring requires energy which, being expended by the slide 20, reduces its velocity. The slide is thus prevented from ever reaching the high velocity which would occur without the ring 34 so that the shock of the abutting of the shoulders 24 and 12 is effectively dimished if not eliminated.

Figure 2:
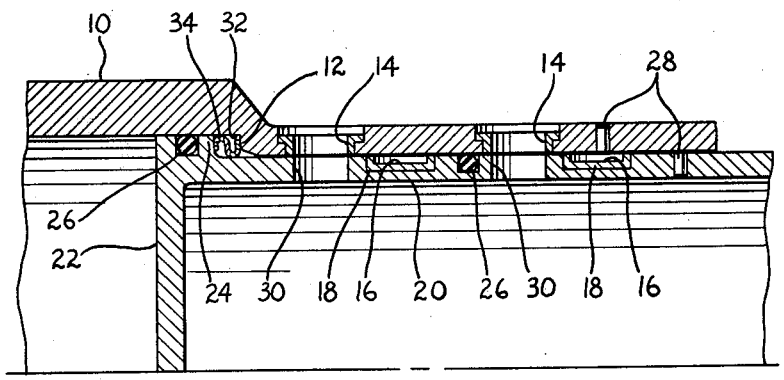
FIGURE 2 is a similar view thereof showing the slide in its final arrested position with the combustion chamber ports and slide ports in alignment.

The ring 34 is crushed substantially flat by the slide 20 as shown by FIGURE 2 and design allowance is made for the thickness of the crushed ring so as to ensure that the propellant inlet ports 14 and 30 are in alignment in the final position of the slide 20.

Figure 3:
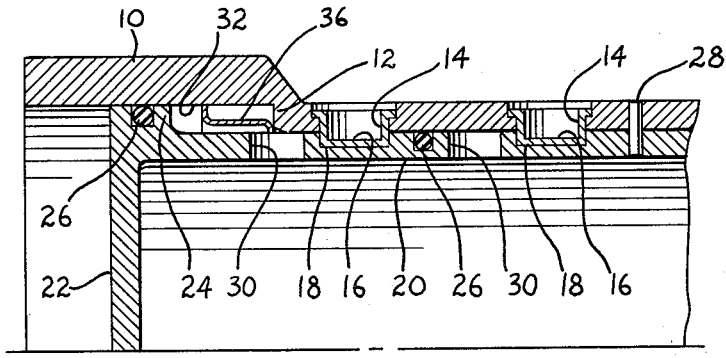
FIGURES 3, 4 and 5 are views similar to FIGURE 1 of different forms of the invention.
Figure 4:
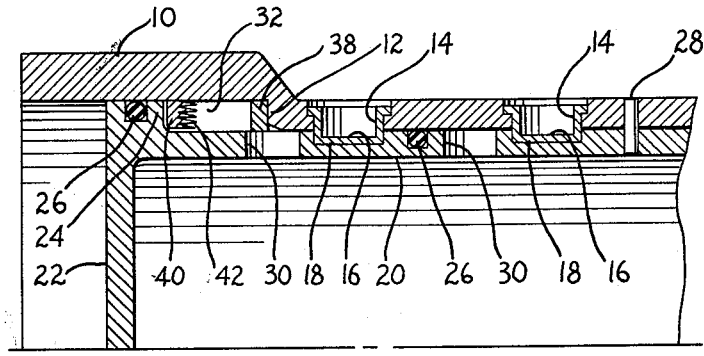
Figure 5:
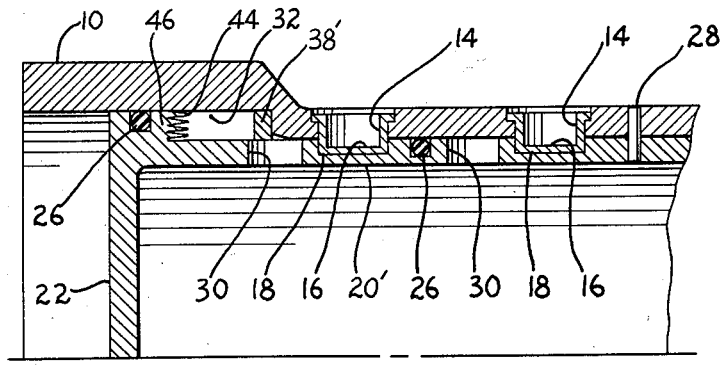

The embodiments of the invention disclosed by FIGURES 3, 4 and 5 differ from that of FIGURES 1 and 2 only in that a different form of cushion is employed in the cushioning chamber 32.

As shown in FIGURE 3, the cushion is in the form of a ring 36 having upturned and down-turned end flanges so as to have a Z shape. The Z shape prevents any possibility of the cushion becoming jammed between the slide 20 and the header 10, and results in the desired crushing action.

As shown in FIGURE 4, the cushion is in the form of a pair of soft metal rings 38 and 40 having a width equal to that of the cushioning chamber 32. Deep teeth or serrations 42 are formed in the side of the soft metal ring 40 which is adjacent to the ring 38 and provide the desired cushioning action when the ring 38 is moved thereagainst and into the root area of the teeth by the slide 20.

The form of the invention shown in FIGURE 5 is quite similar to that of FIGURE 4 except that deep teeth or serrations 44 are formed on the shoulder 46 of the slide 20; the cushioning action being the same when the soft metal ring 38 is forced thereagainst.

It will now be readily apparent that the present invention provides a novel cushioning or energy absorbing device capable of absorbing energy to reduce stopping shock and rebound when positioned between two relatively movable members. As described, it has proven to be an effective means of reducing rebound and impact or ignition shock in missile applications and as a shear slide cushion.

It is to be understood that the forms of our invention herewith shown and described are to be taken as preferred examples of the same and that various changes in shape, size and arrangement of parts may be resorted to without departure from the spirit of the invention or the scope of the subjoined claims.

What is claimed is:

1. A cushioning device for a rocket engine having a combustion chamber and a shear slide movable therewithin and in sliding contact therewith at high velocity from an initial to a final position comprising, in combination, a first shoulder formed on the wall of the combustion chamber, a second shoulder formed on the shear slide and being spaced from said first shoulder in the initial position and in substantial contact therewith in the final position, the wall of the combustion chamber defining an annular cushioning chamber with the slide and said shoulders, and a cushion positioned in said cushioning chamber to absorb the shock of the contact of said second shoulder with said first shoulder on movement of the slide to said final position.

2. A device as recited in claim 1 wherein said cushion is formed solely of relatively soft metal capable of being crushed and deformed.

3. A device as recited in claim 1 wherein said cushion is a flat ring extending from one of said shoulders almost to the other of said shoulders.

4. A device as recited in claim 3 wherein said ring is flanged at its ends to prevent its jamming between the slide and the wall of the combustion chamber.

5. A device as recited in claim 1 wherein said cushion comprises a pair of spaced soft metal rings, one of said rings having teeth formed on a surface thereof adapted to be crushed into the other of said rings upon movement of said second shoulder to said first shoulder.

6. A device as recited in claim 5 wherein said rings have a thickness substantially equal to the radial width of said cushioning chamber.

7. A device as recited in claim 1 wherein said cushion comprises a soft metal ring, and teeth are formed on one of said shoulders and adapted to be crushed into said ring upon movement of said second shoulder to said first shoulder.

8. A device as recited in class 7 wherein said ring and said teeth extend substantially the radial width of the cushioning chamber.

References Cited by the Examiner

UNITED STATES PATENTS

| 2,703,478 | 3/55 | Grimes et al. | 60—35.6 |
| 2,926,638 | 3/60 | Magnus et al. | 89—1 |

FOREIGN PATENTS

| 1,105,404 | 6/55 | France. |
| 18,213 | 8/11 | Great Britain. |

SAMUEL LEVINE, *Primary Examiner.*

SAMUEL FEINBERG, *Examiner.*